No. 794,049.

Patented July 4, 1905.

UNITED STATES PATENT OFFICE.

PAUL SEIDEL AND ROBERT WIMMER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

PROCESS OF MAKING INDIGO-WHITE.

SPECIFICATION forming part of Letters Patent No. 794,049, dated July 4, 1905.

Application filed April 12, 1904. Serial No. 202,827.

*To all whom it may concern:*

Be it known that we, PAUL SEIDEL, a subject of the King of Saxony, and ROBERT WIMMER, a subject of the King of Bavaria, doctors of philosophy and chemists, residing at Ludwigshafen-on-the-Rhine, in the Kingdom of Bavaria, German Empire, have invented new and useful Improvements in the Production of Indigo-White, of which the following is a specification.

When manufacturing indigo according to the more important processes, indoxyl and indoxylic acid, hereinafter referred to as "indoxylic bodies," are obtained as intermediate products, and these are oxidized to indigo. For use the indigo has to be reduced again to indigo-white. No process by which indoxylic bodies could be oxidized to indigo-white has hitherto been known. We have now discovered that indoxylic bodies can be oxidized to indigo-white by using a quantity of oxidizing agent insufficient to oxidize the whole to indigo. We have further discovered that indigo is itself a suitable oxidizing agent for oxidizing indoxylic bodies to indigo-white, and at the same time it is itself reduced to indigo-white. For the purposes of our invention we may, for instance, proceed by blowing through a solution of an indoxylic body a quantity of air sufficient to oxidize the whole to indigo-white, but insufficient to oxidize it all to indigo, or when indigo is used as the oxidizing agent we may proceed by acting upon a quantity of an indoxylic body with such a quantity of indigo that a solution containing practically only indigo-white results. It is not necessary to isolate the indoxyl and indoxylic acid before carrying out this reaction, as the alkaline melt obtained in the usual preparation of these compounds can be employed. We have further discovered that by using a small quantity of certain bodies, which we call "oxygen-carriers"—such as iron salts, alkali sulfites, &c.—the speed of this reaction is increased. The alkali solution of indigo-white which results in either of the foregoing cases can be filtered from any indigo which is present and can be further treated as desired.

The following examples will serve to further illustrate the nature of our invention, which, however, is not confined to these examples. The parts are by weight.

Example 1: To one thousand (1,000) parts of hot water add two hundred (200) parts of a ten (10) per cent. indoxyl melt. Pass a strong current of air through the liquid until indigo begins to separate out freely, and then filter. Indigo-white can be precipitated out of the filtrate by passing carbon dioxid through the solution.

Example 2: Suspend thirty-five (35) parts of finely-divided indigo in two thousand (2,000) parts of water and heat the whole to a temperature of about ninety degrees centigrade, (90° C.) Then add gradually while stirring four hundred (400) parts of a nine (9) per cent. indoxyl melt. After a short time the solution becomes deep orange-red and the indigo goes into solution as indigo-white. The excess of free alkali can then be removed by any of the known methods and the solution is ready for use in the dye-bath.

Example 3: Suspend thirty-five (35) parts of finely-divided indigo in two thousand (2,000) parts of boiling water and add, first, a solution of two and a half (2.5) parts of ferrous sulfate and then three hundred (300) parts of a twelve (12) per cent. indoxyl melt. The indigo goes rapidly into solution.

What we claim is—

1. The process for the production of indigo-white, which consists in oxidizing an indoxylic body with a quantity of oxidizing material insufficient to oxidize the whole to indigo.

2. The process for the production of indigo-white, which consists in oxidizing an indoxylic body with a quantity of oxidizing material insufficient to oxidize the whole to indigo, in the presence of an oxygen-carrier.

3. The process for the production of indigo-white, which consists in oxidizing an indoxylic body with a quantity of oxidizing material insufficient to oxidize the whole to indigo, in the presence of an iron salt.

4. The process for the production of indigo-white, which consists in oxidizing indoxyl with a quantity of oxidizing material insufficient to oxidize the whole to indigo.

5. The process for the production of indigo-white, which consists in oxidizing indoxyl with a quantity of oxidizing material insufficient to oxidize the whole to indigo, in the presence of an oxygen-carrier.

6. The process for the production of indigo-white, which consists in oxidizing indoxyl with a quantity of oxidizing material insufficient to oxidize the whole to indigo, in the presence of an iron salt.

7. The process for the production of indigo-white which consists in oxidizing indoxyl using indigo as the oxidizing agent.

8. The process for the production of indigo-white which consists in oxidizing indoxyl using indigo as the oxidizing agent, in the presence of an oxygen-carrier.

9. The process for the production of indigo-white which consists in oxidizing indoxyl, using indigo as the oxidizing agent, in the presence of an iron salt.

In testimony whereof we have hereunto set our hands in the presence of two subscribing witnesses.

PAUL SEIDEL.
ROBERT WIMMER.

Witnesses:
ERNEST F. EHRHARDT,
J. ALEC. LLOYD.